US012111944B2

(12) United States Patent
Yu

(10) Patent No.: US 12,111,944 B2
(45) Date of Patent: Oct. 8, 2024

(54) METHOD AND SYSTEM FOR POLICY BASED REAL TIME DATA FILE ACCESS CONTROL

(71) Applicant: Jun Yu, Lisle, IL (US)

(72) Inventor: Jun Yu, Lisle, IL (US)

(73) Assignee: Jun Yu, Clarksburg, MD (US)

( * ) Notice: Subject to any disclaimer, the term of this patent is extended or adjusted under 35 U.S.C. 154(b) by 544 days.

(21) Appl. No.: 15/910,834

(22) Filed: Mar. 2, 2018

(65) Prior Publication Data

US 2018/0268159 A1    Sep. 20, 2018

Related U.S. Application Data

(60) Provisional application No. 62/472,562, filed on Mar. 16, 2017.

(51) Int. Cl.
*H04L 29/06* (2006.01)
*G06F 16/13* (2019.01)
(Continued)

(52) U.S. Cl.
CPC .......... *G06F 21/6218* (2013.01); *G06F 16/13* (2019.01); *G06F 16/148* (2019.01);
(Continued)

(58) Field of Classification Search
None
See application file for complete search history.

(56) References Cited

U.S. PATENT DOCUMENTS 7,688,975 B2 *  3/2010  Lin ................. H04L 9/0877
                                                    726/20
8,621,036 B1 * 12/2013  L'Heureux ........... G06F 21/62
                                                    726/28
(Continued)

FOREIGN PATENT DOCUMENTS

EP          1235143 A2      8/2002

OTHER PUBLICATIONS

Terkhedkar, Ankita V.; Shah, Medha A. Providing security mechanisms in broker-less publish/subscribe systems using hierarchical identity based encryption. 2016 IEEE International Conference on RTEICT. https://ieeexplore.ieee.org/stamp/stamp.jsp?tp=&arnumber=7807901 (Year: 2016).*

(Continued)

*Primary Examiner* — Jeremiah L Avery

(57) ABSTRACT

A method and system for file content protection and policy-based access control in a networked environment are provided. It includes an endpoint module which runs on endpoint devices and a key store module which runs on key stores servers. The endpoint computing device where files are created and used generates a content encryption key and unique file identifier (UFI), which are different for each file. The file is encrypted with the content key and attaches the UFI to the encrypted file to create a protected file. The coupled UFI and content key are sent to the key store servers to be stored. To accesses the protected file, end point module reads the UFI and sends it to the key store which responses with the permission as the outcome of evaluation of associated policies and the content key if permission is granted so the file can be decrypted.

7 Claims, 7 Drawing Sheets

(51) Int. Cl.
   *G06F 16/14* (2019.01)
   *G06F 16/17* (2019.01)
   *G06F 21/60* (2013.01)
   *G06F 21/62* (2013.01)
   *H04L 9/08* (2006.01)
   *H04L 9/14* (2006.01)

(52) U.S. Cl.
   CPC ............ *G06F 16/17* (2019.01); *G06F 21/602* (2013.01); *H04L 9/0819* (2013.01); *H04L 9/0869* (2013.01); *H04L 9/0894* (2013.01); *H04L 9/14* (2013.01)

(56) References Cited

U.S. PATENT DOCUMENTS

| | | | | |
|---|---|---|---|---|
| 2003/0046260 | A1* | 3/2003 | Satyanarayanan | G06F 16/148 |
| 2005/0195975 | A1* | 9/2005 | Kawakita | H04L 9/3236 |
| | | | | 380/30 |
| 2008/0212781 | A1* | 9/2008 | Vennelakanti | G06F 21/6218 |
| | | | | 380/277 |
| 2013/0159021 | A1* | 6/2013 | Felsher | G16H 10/60 |
| | | | | 705/3 |
| 2014/0263674 | A1* | 9/2014 | Cerveny | G06K 19/06037 |
| | | | | 235/494 |
| 2014/0325215 | A1* | 10/2014 | Wright | H04L 9/0869 |
| | | | | 713/165 |
| 2014/0351584 | A1* | 11/2014 | Checcucci | H04L 67/06 |
| | | | | 713/164 |
| 2015/0222604 | A1* | 8/2015 | Ylonen | H04L 9/3263 |
| | | | | 713/171 |
| 2015/0263882 | A1 | 9/2015 | Hunter | |
| 2015/0379552 | A1* | 12/2015 | Kent | G06Q 20/202 |
| | | | | 705/14.38 |
| 2016/0080397 | A1* | 3/2016 | Bacastow | H04L 63/1433 |
| | | | | 726/1 |
| 2017/0054674 | A1 | 2/2017 | Moffat | |

OTHER PUBLICATIONS

Ding, Yi; Wang, Xu An. Identity Based Proxy Re-encryption Based on a Variant of BB1 Identity Based Encryption. 2010 Second International Conference on Networks Security, Wireless Communications and Trusted Computing. https://ieeexplore.ieee.org/stamp/stamp.jsp?tp=&arnumber=5480958 (Year: 2010).*

Zhu, Shuaishuai et al. Secure Cloud File System with Attribute Based Encryption. 2013 5th International Conference on Intelligent Networking and Collaborative Systems. https://ieeexplore.ieee.org/stamp/stamp.jsp?tp=&arnumber=6630392 (Year: 2013).*

Extended European Search Report from EP 18767440, dated Mar. 15, 2021, 14 pages.

* cited by examiner

METHOD AND SYSTEM FOR POLICY BASED REAL TIME DATA FILE ACCESS CONTROL

REFERENCE TO RELATED APPLICATIONS

This application claims an invention which was disclosed in Provisional Application No. 62/472,562, filed on Mar. 16, 2017, entitled "Novel System and Software Application to Provide Security Storage of Files and Allow Policy-Based Access Control." The benefit under 35 USC § 119(e) of the United States provisional application is hereby claimed, and the aforementioned application is incorporated herein by reference.

BACKGROUND OF THE INVENTION

Field of the Invention

The invention pertains to the field of information security and access control. More particularly, the invention pertains to file access control though encryption and real-time evaluation of access policies assigned to the file when the file can be identified with a unique file identifier. The invention is also related to the field of identifying and tracking access to all the copies of the file in a computer network environment.

Description of Related Art

Unauthorized access to data files has become a significant threat to enterprises, organizations, governments, and personal privacy. At the same time, the world has become more connected than ever, and file sharing has grown exponentially. The ability to control who can access files and when they can has become the center of cybersecurity, but there has been a lack of solution that balances sharing and access control. Encryption has been used to secure the content of the file and give the user control over who can access the file, but it has also made file sharing more difficult. One method is to use a shared key among a group of users; another is to attach a permission file to the encrypted file and rely on the applications that open the file to honor the permission. Both methods predefine the access right at the time when the file was encrypted, and it is difficult to change the permission after the file creation. For example, sharing a single file with people outside the group would mean having to provide a shared key, thereby giving access to all the files secured by the group key. These shortcomings have made the adaption of file encryption a very limited scope. However, with the method to attach a predefined permission to the file, a permission change would only affect a singular copy of the file that has the modified permission and not the other copies of the same file made prior to the change, since those copies will still have the old permission attached.

BRIEF SUMMARY OF THE INVENTION

In a networked environment, data files often have multiple copies and belong to many users on their own devices. However, this also allows many copies of the files to be unsecure, as permission is set locally on the devices the copy of the file reside that permits owner the full access. This invention provides a solution to the problem of unsecured files by attaching a unique file identifier (UFI) to the original file and consequently every copy of the file it derives, to force users or applications to seek permission every time the file is being accessed from the central servers with the UFI. The central servers evaluate the access policies associated with the UFI and provide permission when appropriate. There can be many ways to ensure the users or applications seek permission before the file can be opened, this invention uses encryption and will have the decryption key sent from the central servers, which are also referred to as the key store servers, only when the access permission is granted.

For simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

DETAILED DESCRIPTION OF THE INVENTION

Figure 1:
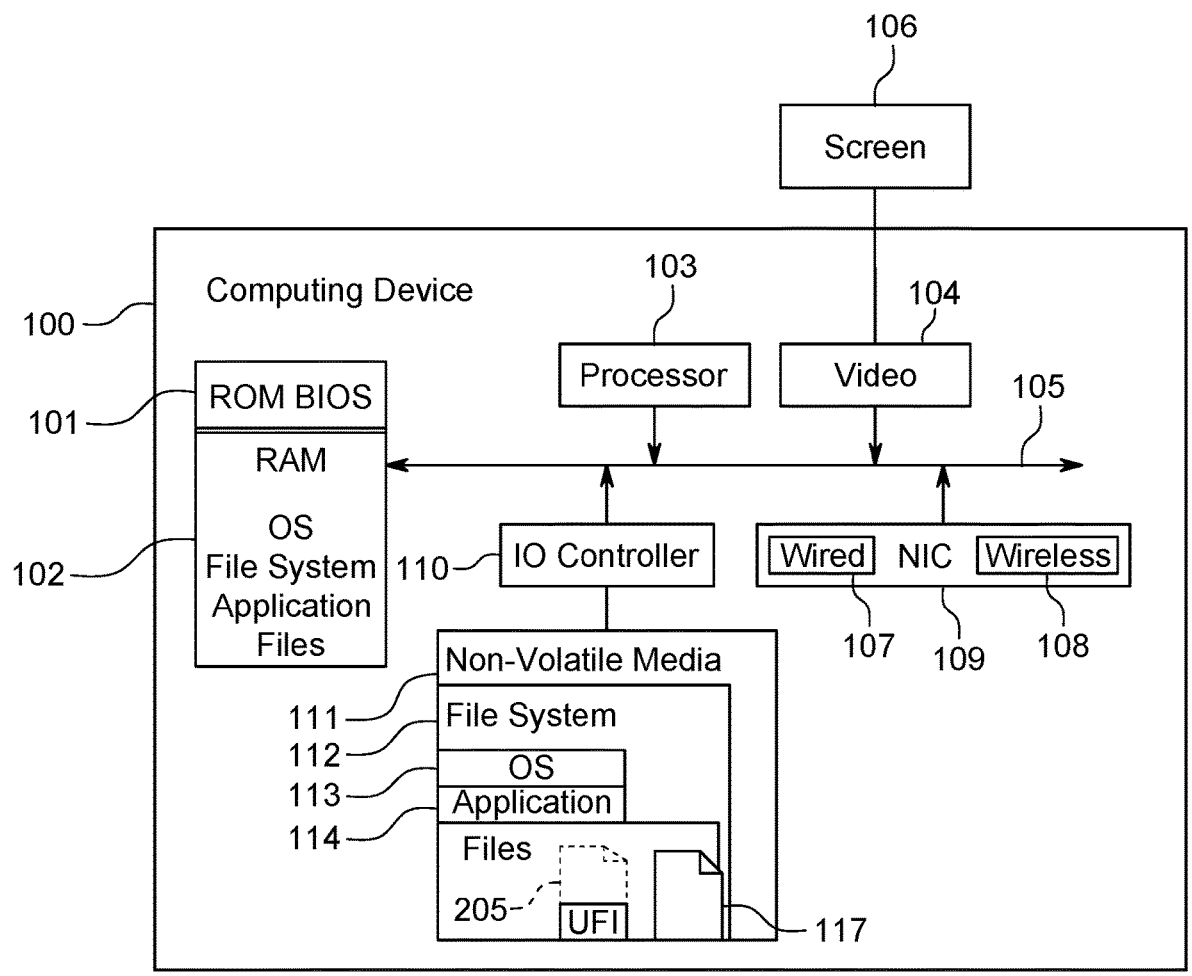
FIG. 1 shows a block diagram of a computing device on which the present invention may be implemented.

As shown in FIG. 1, a computer system 100 is shown within which the present invention may be implemented. The computer system 100 may be a server, endpoint device, or a combination thereof and may be connected to other computer-based resources. The computer system 100 is suitable for storing and/or executing program code and includes at least one processor 103 coupled directly or indirectly to memory elements 101 and 103 through a bus system 105. The memory elements can include local memory employed during the actual execution of the program code, bulk storage, and cache memories which provide temporary storage of at least some program code in order to reduce the number of times the code must be retrieved from the bulk storage during execution.

The memory elements may include system memory in the form of read only memory (ROM) 101 and random-access memory (RAM) 102. A system pre-boot code including basic input-output system (BIOS) may be stored in ROM 101. Run time executable system software code may be stored in RAM 102 including an operating system 113 code. A file system 112 executable code associated with or included in the operating system 113 may also be stored in RAM 102 at runtime. Software applications 114 code may be stored in RAM 102 at runtime which interface with the operating system 113 and file system 112 through application programming interfaces (APIs).

The computer system 100 also includes non-volatile storage media 111 such as primary storage including a magnetic hard disk drive or solid-state disk driver and secondary storage including magnetic, solid state, optical disc drives and USB storage devices. The drives and their associated computer-readable media provide non-volatile storage of computer-executable instructions, data structures, program modules and data files for the system 100. Software applications and files are stored on the non-volatile storage media 111 and are loaded into system memory 102 during runtime.

The computer system 100 may operate in a networked environment using logical connections to one or more remote computers via a network adapter 109 which may be wired that uses wire as medium 107 and/or wireless that uses radio frequencies 108. A display device 106 is also connected to system bus 105 via an interface, such as video adapter 104.

The file system 112 connects through a device driver to communicate with a non-volatile storage device 111 and to manage the files thereon. A file system 112 generally includes methods for storing, referencing, sharing and securing files, accessing file data, and maintaining file integrity. There may not be a clear distinction between the file system 112 and the associated operating system 113. Any of the processes carried out by the file system 112 may be performed by the operating system 113.

The file system 112 may contain plain file 117 and protect file 205 with UFI 116 attached. Protected file 205 may also be protected by encryption, but UFI may not be encrypted and may be obtained by an end point module that has the read right to the file. Some of the benefits to have file level encryption over disk or file system encryption are:
1. Files are protected at rest and against the hacking of the devices.
2. Files are encrypted by an individual key so the risk of large-scale loss of information is minimized.
3. Files can be easily copied and shared among intended users without extra effort while still being protected.
4. Incremental backup and revision control can be done with individual files.

Figure 2A:
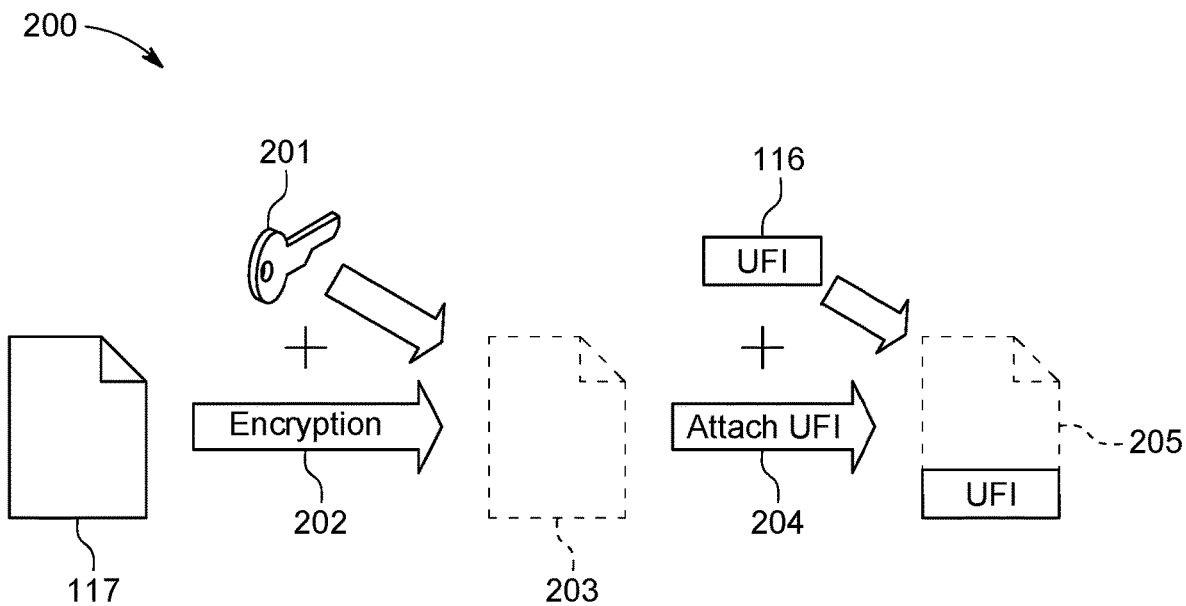
FIG. 2A shows a schematic diagram of the process to encrypt the file and attach the UFI to it when the protected file is created.

While file level encryption is desired, it also brings the problem with key management when files are copied and shared among users and on different devices. Referring to FIG. 2A, an example method 200 of the operation of the endpoint module when encrypting a file is illustrated. This method is running on the endpoint device where the files are created. A plain file 117 is encrypted with the symmetric key 201, also referred to as the content key, to produce the encrypted file 203. Simultaneously, a pseudo-random string is created and certified as unique across the domain. This string is referred to as the unique file identifier (UFI) 116. The UFI 116 is then attached to the encrypted file 203 though process 204 to create protected file 205 that is encrypted and has UFI 116 attached. The UFI 116 and content key 201 are then sent to a key store server on the same computer network to be stored.

A symmetric encryption algorithm is used because it takes a relatively smaller amount of time to encrypt and decrypt large amounts of data than if an asymmetric key cipher is used. The symmetric encryption algorithm used will vary depending on hardware and software support for better performance and maximum security.

A pseudo-random string is chosen here as the UFI for its randomness and is simple to implement. This method is suitable for large scale domains, but sequential numbers or combinations of crafted file attributes can also be used as UFI, as long as a different UFI for each file in the predefined domain is guaranteed. UFI can be calculated using a random generator or with the help of one or more attributes of the file to minimize the possibility of collision.

Figure 2B:
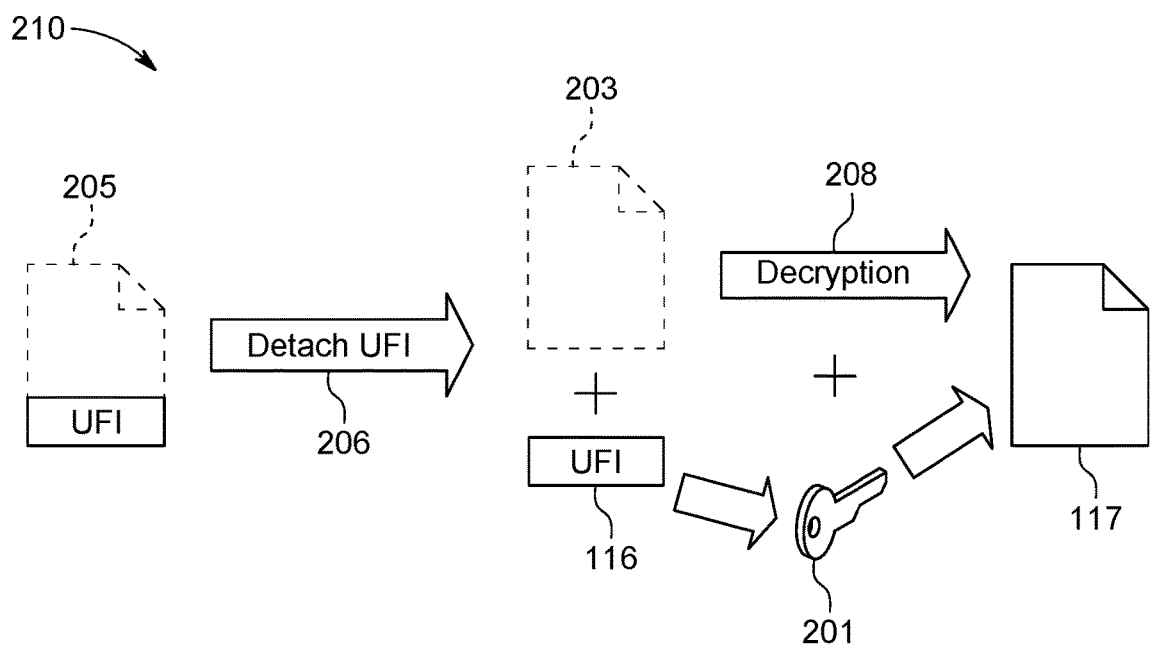
FIG. 2B show a schematic diagram of the process to detach the UFI from a protected file and to decrypt the file to restore its content.

Referring to FIG. 2B, an example method 210 of the operation of the endpoint module when decrypting a file is illustrated. The process 208 reads the UFI from the protected file 205 and detaches the UFI from the protected file 205 to create the encrypted file without UFI 203. The process 208 uses the UFI to obtain the permission for the file and content key 201 from one of the key store servers through the computer network. If the permission is granted, process 208 retrieves the content key 201 for the encrypted file 203. The encrypted file 203 is decrypted by process 209 with the content key 201 to create a temporary plain file 117, which then can be used by applications.

The temporary plain file 117 can be protected by a few methods. If the application is supported, the file may be read into its buffer in memory and overflow to the hard drive if the size is too large. Otherwise it may be placed on an encrypted cache file system and monitored for access. When the file is no longer being accessed, it may be removed. If the file has the write permission and a change was made, the temporary file 117 is encrypted using method 200 with the same content key 201 and UFI 116 to create new protected file 205, which is then copied over the existing protected file or checked in as a new version if revision control is being used.

Figure 3A:
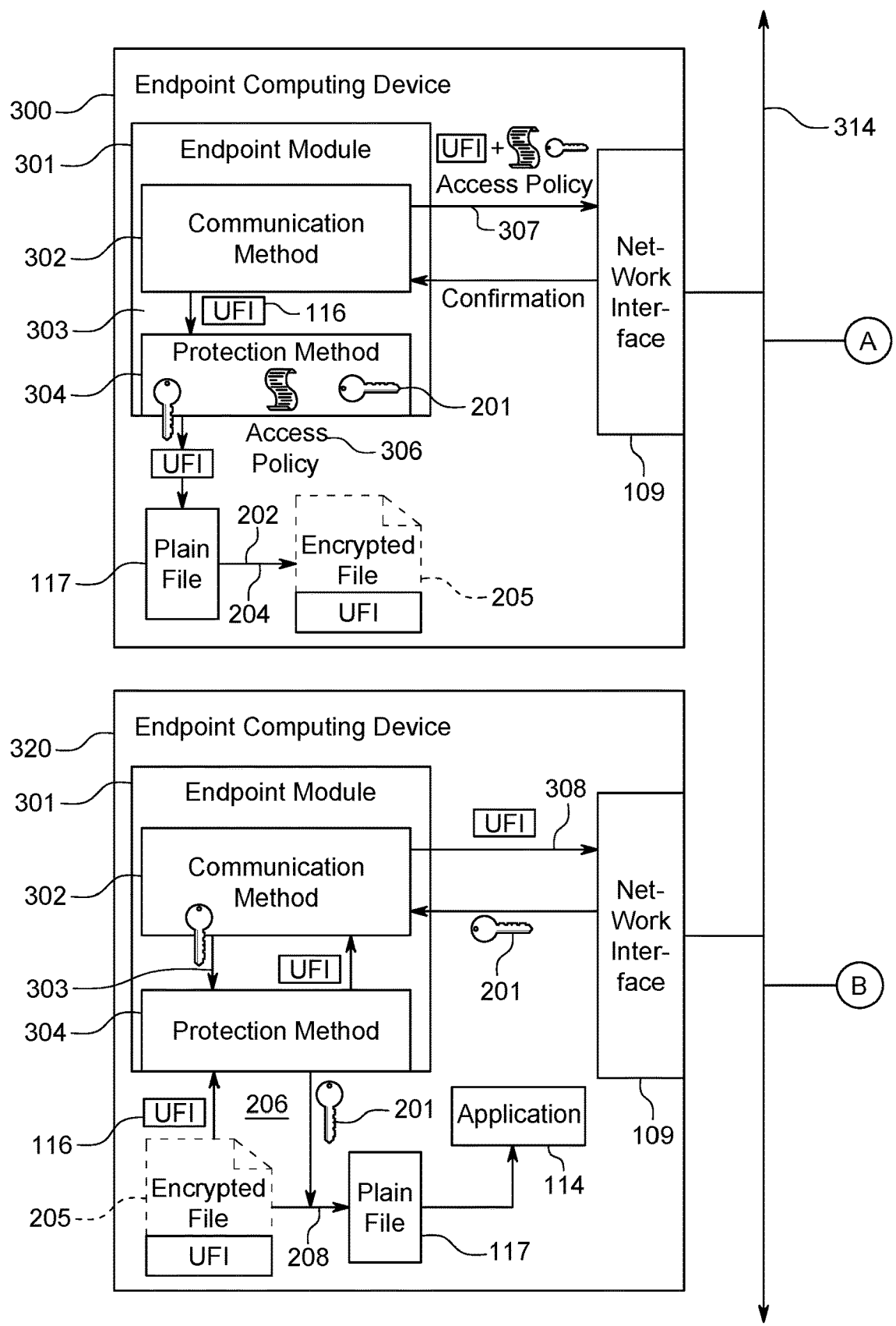
FIGS. 3A and 3B shows a block diagram of the systematic implementation of endpoint modules and key store modules, as well as the message flow among them in a networked environment in accordance with the present invention
Figure 3B:
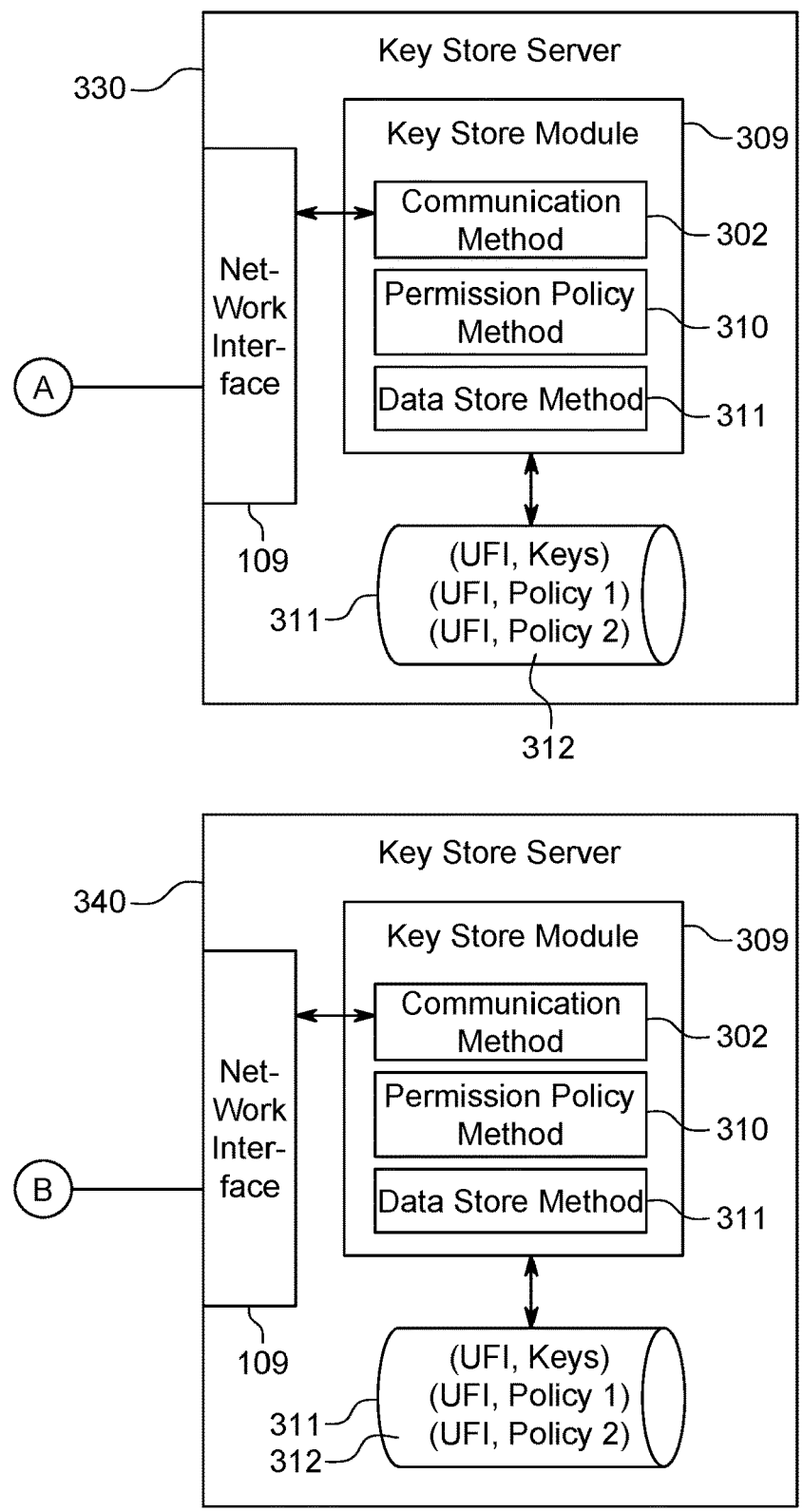

Referring to FIG. 3A and FIG. 3B, a block diagram of systematic implementation illustrates the plurality of endpoint modules and key store modules in a networked environment. The endpoint computing devices 300 and 320 are typically the computing devices 100 that run the endpoint module as an application or as part of the integrated file system to manage the protected files 205 stored on the local storage 111. Although the illustration shows different processes on devices 300 and 320, any endpoint module is capable of both processes. The devices 300 and 320 are operating independently of each other and are used here to demonstrate the plurality of endpoint devices that exist on a networked environment. In this environment, all devices, including endpoint devices and keys store servers, are interconnected through computer network 314 to exchange information.

The key store servers 330 and 340 typically are the computing devices 100 which run the key store module as an application. The servers use a data storage facility 311 which may be a relational database, other type of database system or plain files, to store the UFI 116 and content keys 201 along with the access policies. The data 312 are stored in a deterministic relationship that any given UFI is linked with only the content keys that can be used to encrypt and decrypt the file said UFI is attached to. Any given UFI 116 is also linked with only the policies assigned to the file that has said UFI attached to it. The key store devices 330 and 340 may have different relationship with each other depending on the system design that includes mirrors of each other for high availability, or handles different sets of endpoint devices to expand the capacity, or none if they serve different domains that coexist on the same network. The devices 330 and 340 are used to demonstrate the design of the plurality of key store devices, as the number of key store servers is not limited to just two. There can be as many interconnected key store devices as needed, as long as the deterministic relationships between UFI 116 and content encryption key 201 and between UFI 116 and its access policies are maintained.

The end computing device 300 illustrates the process of creating new protected file 205. The process is handled by an application of Endpoint Module 301. The same process may be integrated into the file system and is automatically performed when a designated file is being saved. The Endpoint Module 300 also handles the decryption process as demonstrated in Endpoint computing device 310. The Endpoint Module 301 comprises communication method 302 and protection method 303. The communication method 302 communicates with a plurality of key store servers, including 330 and 340, through networking interface 109 attached to computer network 314, which may be wired or wireless. All communication between the end point device and key store servers are encrypted to protect the content. It performs the tasks including user registration and authentication, sending UFI 116 and encryption keys 201 through process 307, and retrieving permission and keys 308. The protection method 304 performs file related tasks including process 204 and 206 handling UFI 116, methods 200 and 210 encryption and decryption of the content of the file as well as removing the temporary plain file when it is no longer needed.

Demonstrated through Endpoint device 300, the plain file 117 is designated to be protected. The endpoint module authenticates the user and endpoint device 300 with the key servers though communication method 302. The authentication may be achieved by using existing user and device management infrastructure including Microsoft Windows Domain and Active Directory. The process is not discussed here in detail because it is not the core of this invention and those who are sufficient in the art may achieve the same. The endpoint module calls the protection methods to generate a proposed UFI 116 and content encryption key 201 using a random number generator. The proposed UFI 116 along with the content key 201 and access policies 306 are then passed onto communication method 302, which sends proposed UFI 116 along with content key 201 and access policies 307 to Key Store Servers 330 and 340 to query the existence of the proposed UFI. In the case the UFI 116 already exists in any one of the Key Store Servers, the Key Store Server sends back the response of existence of proposed UFI to Endpoint Module's communication method 302 and the protection method 304 generates a new proposed UFI 116 and repeats the confirmation process. If the Key Store Servers respond that none have the existence of the proposed UFI 116, the proposed UFI 116 is accepted by the protection method as the permanent UFI 116 for the file. The protection method 302 uses content key 201 to encrypt the file 117 to generate encrypted file 203 through process 202 and attaches permanent UFI 116 to the encrypted file using process 204 to create protected file 205. The communication method 302 then sends confirmation of the deployment of UFI 116 and file content key 201 to the plurality of Key Stores Servers 330. Selected key store server 330 stores the coupled UFI 116 and file content key 201, as well as the plurality of coupled UFI 116 and access policy 307 in its database or similar data structure to create a deterministic relation that ensures every time it retrieves the same content key 201 and same set of access policies whenever UFI 116 is provided.

The illustration of protected file 205 shows UFI 116 is attached as the header of the encrypted file 203. Other methods to attach extern UFI 116 include using it as the full or part of the file name, or writing it into a separate meta file and bundling said meta file with encrypted file 203 to create an archive file.

This embodiment uses a pseudo-random string as UFI 116 which may be calculated with one or more file attributes as input or created by random number generator without using any of the file attributes. There are other means to create UFI 116, including incremental numbers, a carefully crafted file name, or a combination of file attributes including timestamp, file size, and file name. Although the methods to use file attributes are not always reliable because the file attributes can be changed at any time, the file attributes can be managed to be unique within a small-scale environment and therefore may be used as UFI 116. If only file attributes are used as a UFI, there is no longer a need to attach a UFI to the file.

The endpoint device 320 illustrates the endpoint module 301 performing the process to open the contents of the file when protected file 205 is to be accessed. The user has to have the read rights to the protected file 205 in order to initiate the request. Following the user authentication process, the protection method 304 reads the UFI 116 from protected file 205 and passes the UFI to communication method 302 through process 205. The communication method 302 sends the request, which contains the UFI 116 for permission and the content key 201, to the plurality of Key Store Servers 330 and 340 through process 308. It receives a response from the Key Store Server 340 with permission and the possible content key 201 when read permission is granted. If permission is granted and content key 201 is obtained, the protection method strips out the UFI attachment from the protected file 205 and decrypts the file with content key 201 into a plain file 107 that is placed into either memory or a secured cache temporary storage to be opened by application 114, through process 208.

An alternative embodiment of this invention may be archived to use a separated meta file to store the UFI 116 and/or content key 201. The meta file may be encrypted with a public key, and the coupled private key that is used to decrypt the meta file may be stored at the Key store servers. The access policies coupled with the UFI are stored on the key store servers. In this design, the endpoint module sends the encrypted meta file to the key store servers after successful authentication. The key store server decrypts the file using the private key, reads the UFI, finds the access policies associated with UFI 106, evaluates the access policies, and sends the content key 201 and UFI 106 to the endpoint module to allow decryption of the file and create a new version of protected file 205 if the content is modified and write permission is granted. The advantage of this embodiment is for easy recovery of the content key, and the biggest disadvantage is the single point of vulnerability: the private key. The loss of the private key to the meta file would lead to the possibility of circumventing the access policies for all the protected files in the domain.

The protection method monitors the access of plain file 107. If the file 107 is closed by the application 114, the protection method closes the file 107 according to the permission granted by the key store servers and whether changes were made to file 107. If the permission is read only, protection method will remove the file 107. If the write permission is granted and changes were made to plain file 107, the protection method encrypts the plain file and attaches the UFI to create a new version of protected file 205 and then removes the plain file 107. The protection method replaces the protected file 205 with the newly created copy if no revision control is used, or stores the latest copy as a new version if revision control is in place.

FIG. 3B demonstrates the existence of the plurality of Key Store Servers 330 and 340 in a network environment. 330 and 340 are typically the computing device 100 running the key store module as an application and data storage facility 311. Key store module application running on all key store servers 330 and 340 are similar in functionality, but the data stored on the key store servers may be different. Some of the key store servers may have identical data 312 stored as back up to each other for high availability, while some of the key stores may have different sets of data 312 stored so they serve different sets of UFI 116. This functionality is in place to expand the number of files that may be protected.

The Key Store Module 309 contains 3 methods: communication method 302, permission policy method 310, and data store method 311. The communication method 302 communicates with the endpoint device modules and other key store modules on the same network. It uses the key store server's network interface 109, which is connected to network 314 through wires or radio frequencies. The communication method encrypts all communications. The data store method 311 communicates with storage facility 311 using the process 310. The dataset 312 stored on the store facility includes the coupled UFI and content key as well as the coupled UFI and access policies, and it may expand to include other data for security check and audits. The permission policy method 309 uses the data store method 311 to retrieve the access policy. It also uses the communication method 302 to collect information from other network devices as requested by access policies and evaluates the access policies and provides responses with permission and the content key to the communication method 302 if read permission is granted. The communication method 302 sends the response to the endpoint module that requested the access.

There is a plurality of key store servers that actively serve the same domain. These key store servers are divided to serve different segment of the requests. They can be divided by users, or end point devices, or UFI 116, so that any UFI 116 may be served by only one active key store module for the given request, although the same UFI can be stored on multiple back up key store servers.

The access policies may be modified at any time by the users who have the permission to do so including file owners, group managers, and policy administrators. The endpoint module may be used for this purpose through protection method 304. Once the policies are accepted by key store servers, they take effect on the future access requests to all physical copies of the file that share the same UFI. The endpoint module does not' need to have access to the actual protected file to create or change the policies as long as it knows the UFI 116 of the protected file 205.

Figure 4A:
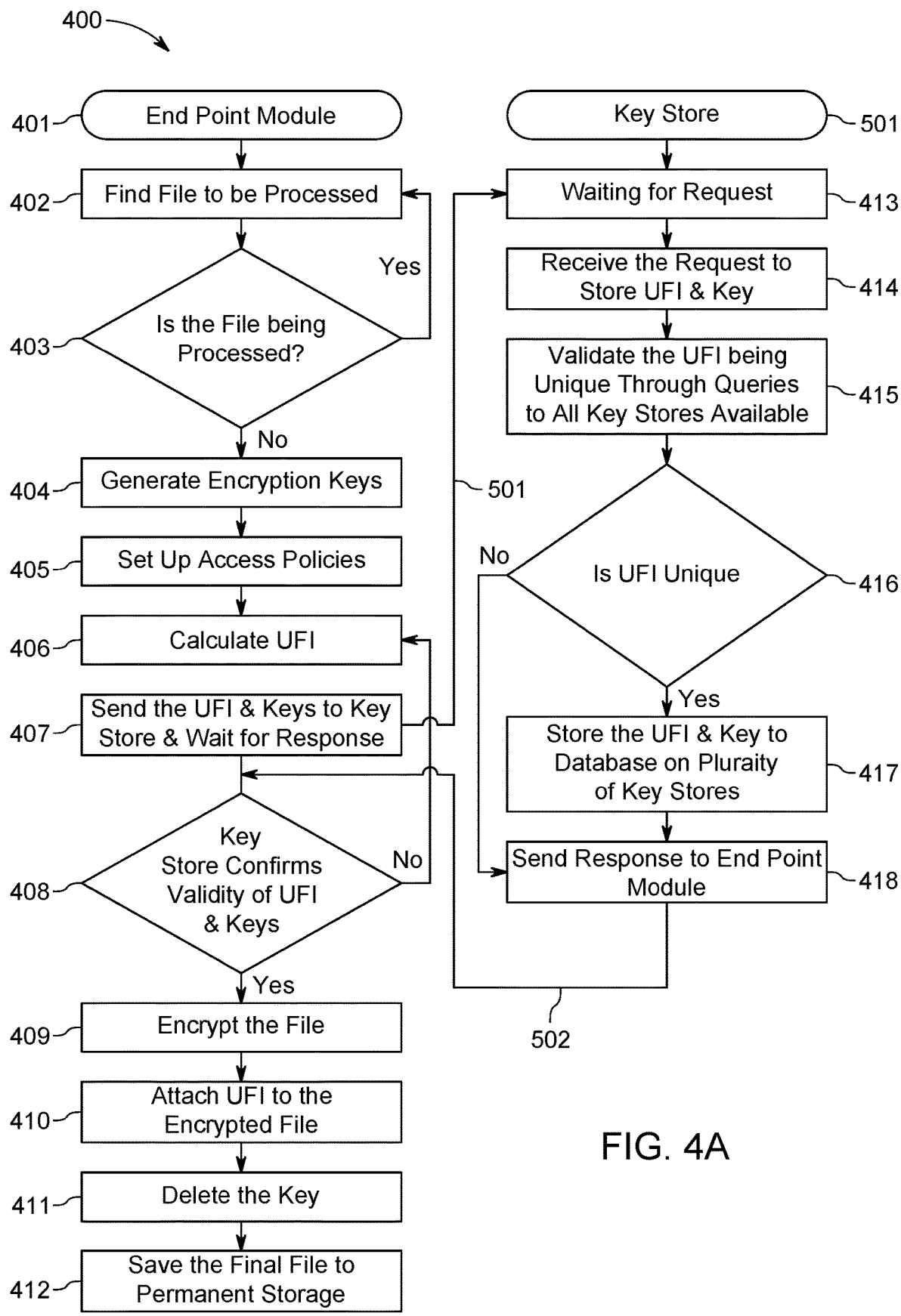
FIG. 4A shows a flow diagram of the process of creating a protected file with encryption and a UFI attached and stored in the key store so access policies can be assigned.

Referring to FIG. 4A, a flow diagram 400 shows the process of creating a protected file initiated by endpoint modules. The process starts 401 and the endpoint module finds the file to be protected 402. The end point module checks the file 403 for its UFI. If the file has a UFI attached, it is already being protected, so the endpoint module goes back to looking for next file 402. If no UFI is found, the endpoint module generates content encryption key 404. The user sets the initial access policies for the file 405. The endpoint module calculates proposed UFI 406, and the endpoint module sends proposed UFI and content key 201, access policies 306 to key stores 407 through network connection 501 and waits for a response.

The key store module starts and waits for request 413. The key store module receives the proposed UFI 116 414, and searches its record for the existence of the proposed UFI 415. If any one of the key store modules has the same proposed UFI 416, it creates the response of invalid UFI 418. If none of the key store modules has the same UFI, the key store modules store the coupled UIF and key into the storage facility 417 and create the response of valid UFI 418. The response is sent back to endpoint module through network 502. The process ends at the key store module.

The endpoint module examines the response from key store module 408. If the response is an invalid UFI, the endpoint module goes back to generate a new proposed UFI 406 and sends it to key store 407; the process continues until the key store server responses with a valid UFI 408. Once the UFI is validated by the key store module, the endpoint module encrypts the file 409 and attaches UFI 116 to the encrypted file 410 to create protected file 205. The content key is deleted from the memory 411, and the protected file is placed onto the file system for storage 412. The process ends at the endpoint module.

Figure 4B:
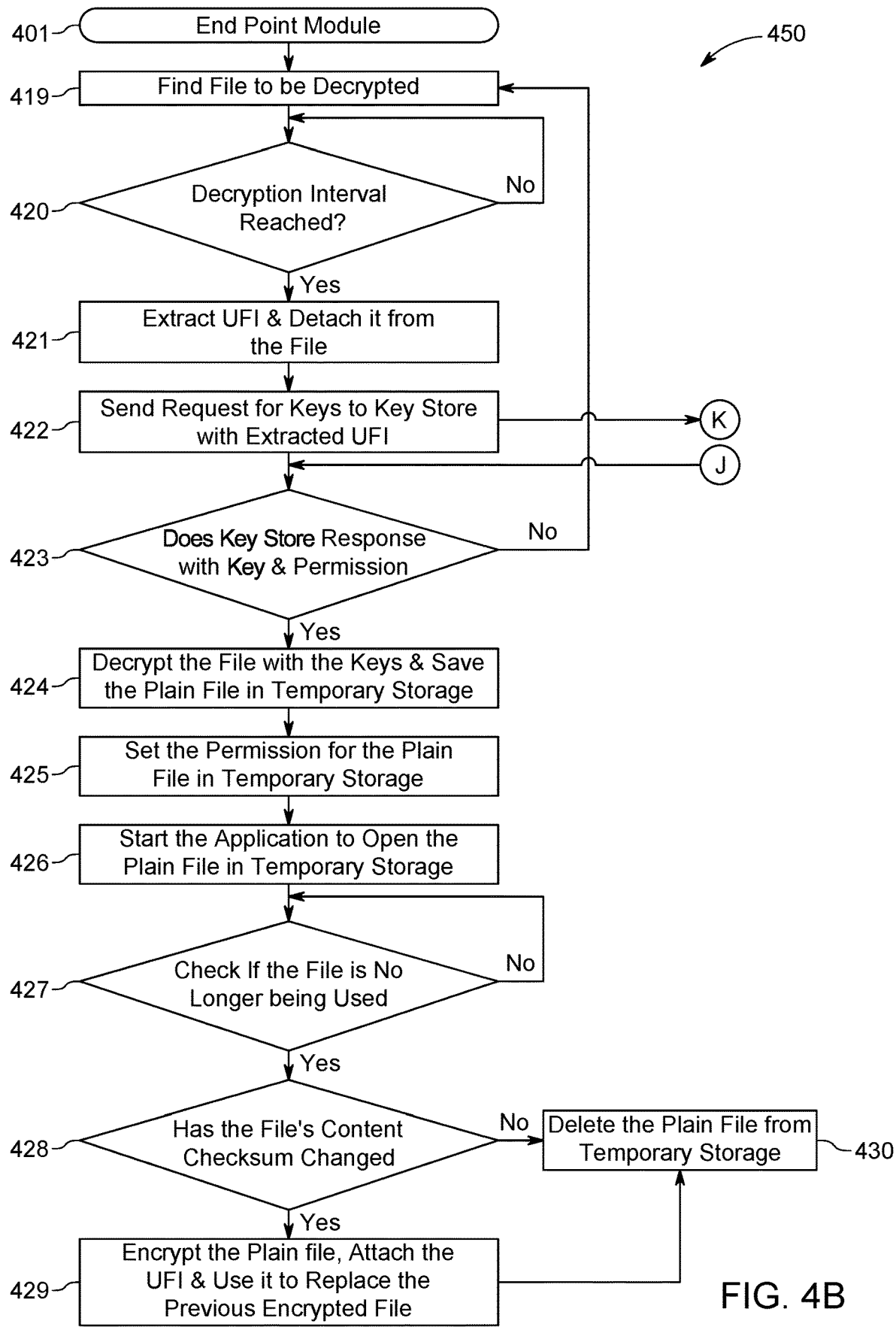
FIGS. 4B and 4C shows a flow diagram of the process to access a protected file, including detaching the UFI, obtaining permission and decryption keys from the key stores and decrypting the file to its original content if permission is granted.
Figure 4C:
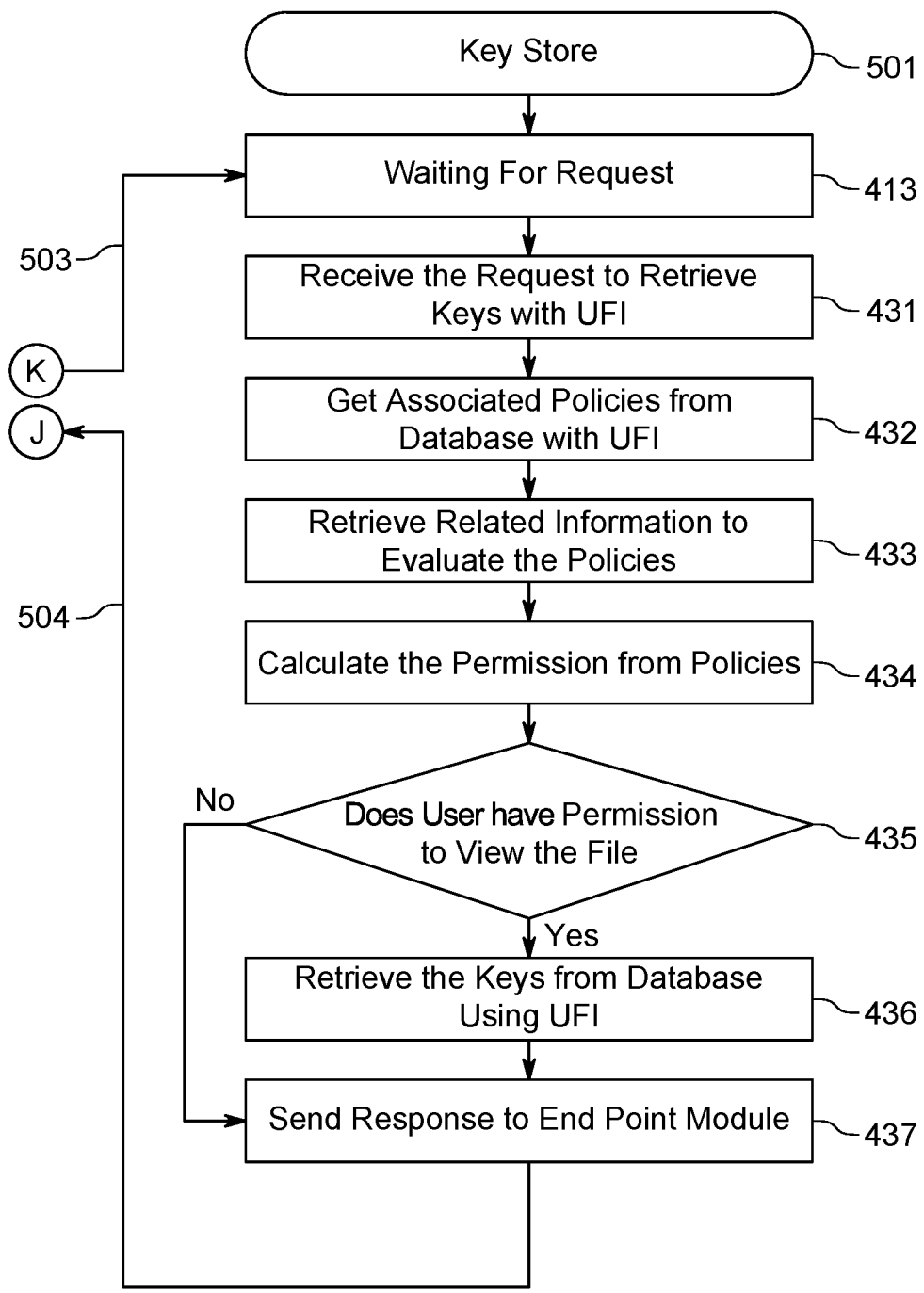

Referring to FIG. 4B and FIG. 4C, a flow diagram of the process to decrypt the protect file and reveal its contents to be worked on through application is shown. The process 450 starts at endpoint module 401. The endpoint modules find the protected file to open 419. The end point module determines if the decryption interval timer has expired 420 and if it has not, it waits for it to expire. The decryption timer is designed to limit the number of files that can be decrypted by a single user and serves the purpose of limiting the damage of massive loss of information. It is set according to organization policy and the historical working record of the user. It gets longer when more files are being decrypted within a given time frame and resets after a period of time of no new decryption request. If the timer expired, the end point module reads the UFI from the protected file 421 and sends the UFI to the key store to request permission and content key 422. The request is sent to the key store module though network 503, and the endpoint module waits for response.

The key store module starts and waits for request 413, as demonstrated on FIG. 4C. It receives the request from endpoint module 431. The key store module queries store facility to get access policies coupled with the UFI 432. It acquires information needed 433 and evaluates the access policies 434. If the request does not qualify for read permission, the key module constructs a response of "no access" 435. In the case that read or more permissions are granted 435, the key store retrieves the coupled content key 436 and constructs a response with permission and the content key 437. The response is sent to the endpoint module through network 504. The key store module process ends.

The endpoint module receives the response from the key store module and examines the response 423. If the response is "no access," the endpoint module leaves the protected file unchanged and finds the next file to decrypt 419. If the permission from the key store module is minimally read and the content key is present, the endpoint module decrypts the file with the content key and places the plain file into temporary cache folder 424. It sets the plain file's read and write permission according to the key store module response 425. The endpoint module then starts the application based on user selection or system settings and directs the application to open the plain file 426. The endpoint module constantly checks if the plain file is being accessed 427. If yes, it does nothing and checks again. When the endpoint module detects that the plain file is no longer being accessed by the application, it checks if the file content has been changed 428. This only happens if the user has been granted write permission, since the plain file won't be writable without write permission due to the permission set at 425. If the file has been changed, the endpoint module encrypts the plain file and attaches a UFI to create a new version of the protected file and uses it to replace the existing protected file as latest version 429. The temporary plain file is deleted 430 after encryption or no change was made. The endpoint module process ends.

Certain advantage over prior art should now be easily identified. For example, the forgoing provides a method to manage file permission regardless of the physical location and changing of file attributes like file name, path, and version, and allows for change of permission policies to take effect universally and in real time.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read only memory (ROM), a rigid magnetic disk and an optical disk. Current examples of optical disks include compact disk read only memory (CD-ROM), compact disk read/write (CD-R/W), and DVD.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A computer system in a networked environment to identify a data file and allow access to the content of the data file wherein such access is allowed only after it is permitted by access policies, the system comprising a plurality of endpoint computing devices and a plurality of key store servers:

wherein the plurality of endpoint computing devices comprises a computer network connection to at least one key store server and:
  generates at least one symmetric encryption key for each of a plurality of data files to be encrypted, and
  encrypts each of the plurality of data files using an unused encryption key to create an encrypted data file with a new unique file identifier (UFI) attached such that the UFI is retrievable from the encrypted data file without the encryption key, each UFI being a different string or number that is confirmed to be unique among key store servers, and
  sends each UFI, paired with the encryption key of the encrypted file the UFI is attached to, to the connected key store servers; and
  extracts the UFI from an encrypted file without the encryption key of the encrypted file when a user attempts to access that encrypted file from a plurality of encrypted files, and
  sends an access request with the retrieved UFI to the connected key store servers for the user, and
  receives a response to the request from the connected key store servers, and
  retrieves, from the response, the encryption key, if present, and the permissions for the UFI, and
  if the permissions allow access, decrypts the encrypted file and controls the user's access to the decrypted content and the encrypted file itself by matching the permissions, or
  if the permissions deny access, denies the user access by not decrypting the encrypted file; and
wherein the plurality of key store servers stores access policies that output access permissions after evaluation; and
  receives a plurality of pairs of a UFI and an encryption key, and stores the plurality of pairs with each UFI coupled with the paired encryption key so that said encryption key can be retrieved using the UFI; and
  associates a set of access policies to each of the stored UFIs; and
  receives a file access request that contains UFIs from an endpoint computing device for a user, and
  calculates access permissions for each of the UFIs in the request through evaluating the access policies associated with the UFI and, if access is not denied by the access permissions, retrieves the encryption key that is coupled with the UFI, and links the access permissions and the encryption key, if retrieved, to the UFI, and
  sends a response that contains the access permissions and if retrieved, the encryption key, linked with each of the UFIs from the request, to the requesting computing device.

2. The system of claim 1, wherein the endpoint computing devices further comprises a processor, network interface card, memory and non-transitory storage and wherein the plurality of endpoint computing devices:
  encrypts each of a plurality of data files with a newly generated encryption key to create an encrypted data file, and
  attaches a new UFI to the encrypted data file in a manner such that the UFI is retrievable from the encrypted file without the encrypted data file's encryption key, and
  sends each encryption key, coupled with the UFI attached to the encrypted file created by the encryption key, to the connected key store servers.

3. The system of claim 1, wherein the key store server device further comprises a processor, network interface card, memory and non-transitory.

4. The system of claim 1, wherein a UFI is a string or a number that is unique among key store servers, and the uniqueness of a UFI is confirmed by querying key store servers.

5. The system of claim 1, wherein the plurality of key store servers further comprises program instructions to store access policies that output access permissions; and to associate a set of policies to each of the stored UFIs; and to use the set of polices associated with a UFI to determine access permissions, which consist of denying access to the decrypted contents, allowing read access to the decrypted contents of an encrypted file without the ability to make changes to the encrypted file, and allowing read access to the decrypted contents of an encrypted data file and saving changes of the contents to the encrypted data file.

6. The system of claim 1, wherein the plurality of endpoint devices further comprises program instructions to apply a limit on the number of data files accessed by a user within a time frame; whereby if the number of accessed data files by a user exceeds the limit within the time frame, the endpoint devices will wait for a period of time before sending a new access request for the user.

7. The system of claim 1, wherein the plurality of endpoint computing devices:

retrieves a UFI from each of a plurality of encrypted data files without the encryption key of the encrypted data file, and sends an access request for a user that contains the retrieved UFIs to the connected key store servers, and receives a response to the access request from the connected key store servers, and for each requested UFI, retrieves, from the response, the access permissions and the encryption key, if present, associated with the UFI, locates the encrypted file with the same UFI, and prevents the user from accessing the contents of the encrypted file by not decrypting the file if the permissions deny access, or if the permissions grant access, decrypts the encrypted file and controls the user's access to the decrypted content and the encrypted file itself by matching the permissions.

* * * * *